(12) United States Patent
Lee et al.

(10) Patent No.: US 11,694,365 B2
(45) Date of Patent: Jul. 4, 2023

(54) OPTICAL SENSOR DEVICE AND METHOD USED FOR DETECTING A COLOR OF A SPECIFIC SURFACE OF AN OBJECT

(71) Applicant: PixArt Imaging Inc., Hsin-Chu (TW)

(72) Inventors: Tsung-Hsueh Lee, Hsin-Chu (TW); Shu-Sian Yang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 224 days.

(21) Appl. No.: 17/232,138

(22) Filed: Apr. 15, 2021

(65) Prior Publication Data

US 2022/0335653 A1 Oct. 20, 2022

(51) Int. Cl.
*G06T 7/90* (2017.01)
*G06T 7/70* (2017.01)

(52) U.S. Cl.
CPC ............... *G06T 7/90* (2017.01); *G06T 7/70* (2017.01); *G06T 2207/10024* (2013.01); *G06T 2207/10052* (2013.01)

(58) Field of Classification Search
CPC ... G06T 7/90; G06T 7/70; G06T 2207/10024; G06T 2207/10052; G06T 7/0004
USPC ......................................................... 382/100
See application file for complete search history.

(56) References Cited

U.S. PATENT DOCUMENTS

| 5,537,211 A * | 7/1996 | Dial .................. G01J 3/524 |
| | | 356/402 |
| 2020/0020011 A1 * | 1/2020 | Harvill ............... G06Q 30/018 |
| 2021/0161355 A1 * | 6/2021 | Rahn ................... G06T 7/90 |
| 2021/0187526 A1 * | 6/2021 | Kundem ............ G01J 3/0262 |
| 2021/0372772 A1 * | 12/2021 | Ahn .................. G01B 11/026 |

* cited by examiner

*Primary Examiner* — Ali Bayat
(74) *Attorney, Agent, or Firm* — Winston Hsu

(57) ABSTRACT

A method of an optical sensor device used for detecting a color of a specific surface of an object includes: providing a sensor array having a plurality of pixel units each for receiving light reflected from the specific surface to generate a sensed pixel value; using the sensor array to generate a specific image formed by a plurality of sensed pixel values; determining whether the specific image is similar to a first solid color image corresponding to a first color according to the plurality of sensed pixel values of the specific image; and determining to execute a distance detection operation to calculate a specific distance from the optical sensor device to the specific surface according to a color saturation value of the first color in the specific image when it is determined that the specific image is similar to the first solid color image corresponding to the first color.

10 Claims, 7 Drawing Sheets

OPTICAL SENSOR DEVICE AND METHOD USED FOR DETECTING A COLOR OF A SPECIFIC SURFACE OF AN OBJECT

BACKGROUND OF THE INVENTION

1. Field of the Invention

The invention relates to an optical sensing mechanism, and more particularly to an optical sensor device and a corresponding method.

2. Description of the Prior Art

Generally speaking, a toy manufacturer may produce and provide colored/colorful objects such as toys, models, or toy bricks for users such as children. The toy manufacturer may provide some game rules to make a child learn or train some skills such as muscle persistence. Some game rules may request a child to perform a specific behavior or action, e.g. moving an object to a specified position at a specific distance away from another colored/colorful object. A conventional method is to use human judgment such as human eyes to decide whether the object is moved to the specified position. However, this greatly reduces the fun of playing the game.

SUMMARY OF THE INVENTION

Therefore one of the objectives of the invention is to provide an optical sensor device used for detecting a color of a specific surface of an object and a corresponding method, to solve the above-mentioned problems. The optical sensor device can automatically detect or determine whether a user such as a child correctly performs a corresponding behavior or action.

According to embodiments of the invention, an optical sensor device used for detecting a color of a specific surface of an object is disclosed. The optical sensor device comprises a sensor array and a processing circuit. The sensor array has a plurality of pixel units each for receiving light reflected from the specific surface to generate a sensed pixel value. The processing circuit is coupled to the sensor array, and is used for determining whether the specific surface belongs to a first color, and used determining a specific distance from the optical sensor device to the specific surface according to a color saturation value of the first color in a portion of sensed pixel values.

According to the embodiments, a method of an optical sensor device used for detecting a color of a specific surface of an object is disclosed. The method comprises: providing a sensor array having a plurality of pixel units each for receiving light reflected from the specific surface to generate a sensed pixel value; using the sensor array to generate a specific image formed by a plurality of sensed pixel values; determining whether the specific image is similar to a first solid color image corresponding to a first color according to the plurality of sensed pixel values of the specific image; and determining to execute a distance detection operation to calculate a specific distance from the optical sensor device to the specific surface according to a color saturation value of the first color in the specific image when it is determined that the specific image is similar to the first solid color image corresponding to the first color.

These and other objectives of the present invention will no doubt become obvious to those of ordinary skill in the art after reading the following detailed description of the preferred embodiment that is illustrated in the various figures and drawings.

DETAILED DESCRIPTION

The embodiments of the invention aim at providing a novel optical sensor device which is capable of detecting or estimating a distance (or distance change) between first and second colored/colorful objects (more particularly the objects with solid colors, but not limited) by performing color saturation detection to detect color saturation value (or color saturation change) in the image generated from the light reflected from a surface of a portion of the second colored/colorful object wherein the optical sensor device is configured within or installed on the first colored/colorful object. The color saturation value of an image such as a pixel image may indicate the purity and intensity of a specific color as displayed in the image or indicate the value of color saturation in the image for the specific color represented by the HSL/HSV color space. Particularly, in order to make a user such as a child learn some skills such as fine motor skill, cooperative play skill, muscle persistence, and so on, such novel optical sensor device can be used to estimate or determine whether the child performs or achieves corresponding behavior(s) or action(s) which is/are matched to game requests/rules/designs when the user plays the colored/colorful objects.

Figure 1:
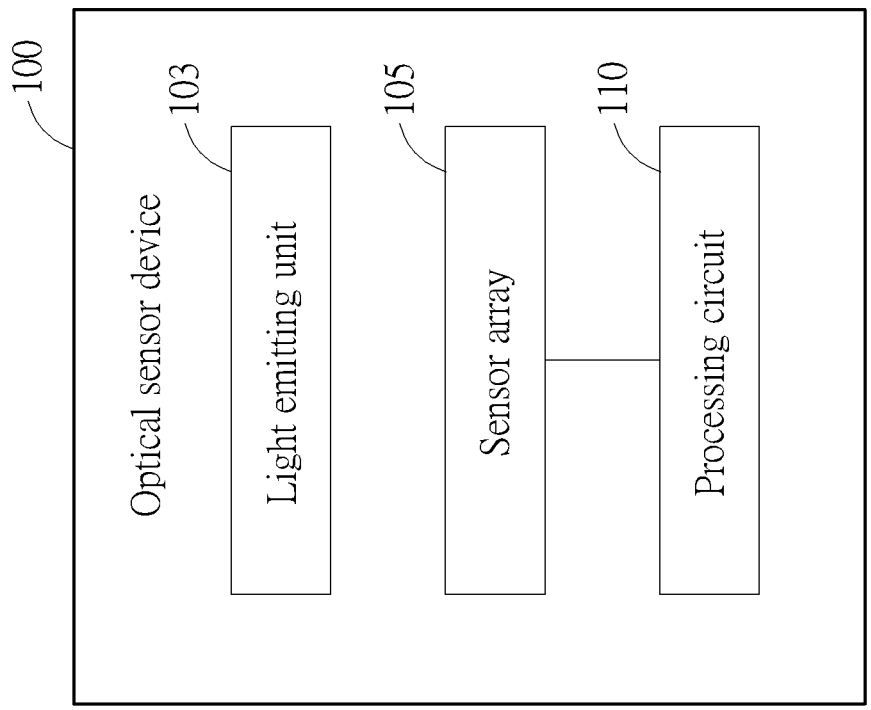
FIG. 1 is a block diagram of an optical sensor device used for detecting the color and/or color saturation of a specific surface of one or more colored/colorful objects to determine or estimate the distance between the colored/colorful objects according to an embodiment of the invention.
Figure 1:
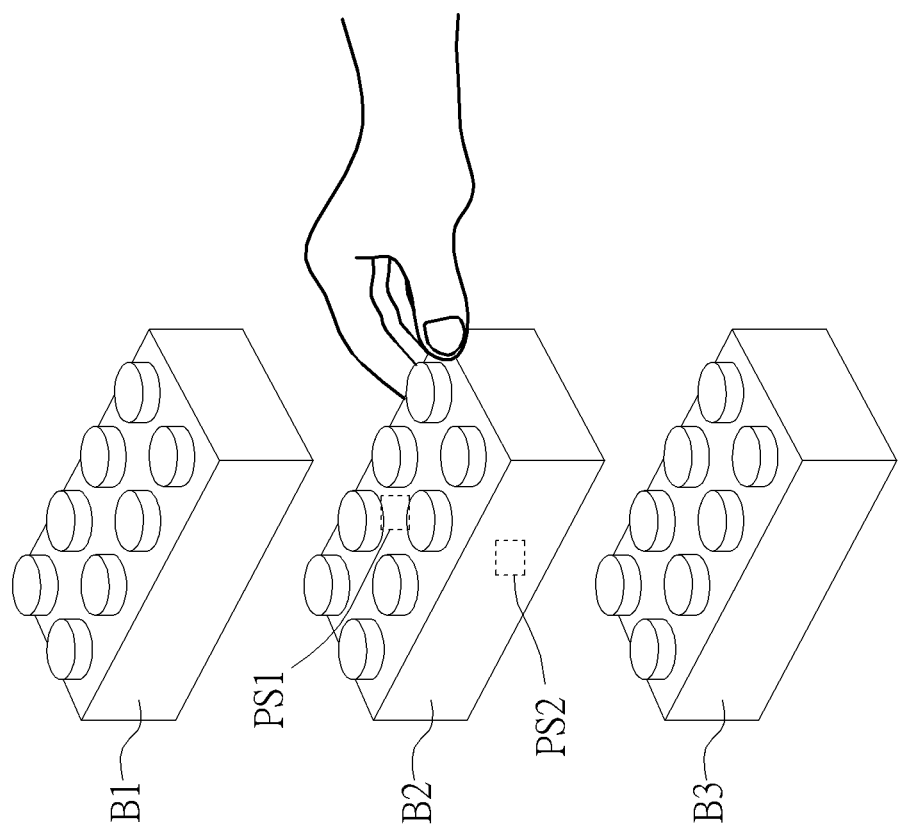

FIG. 1 is a block diagram of an optical sensor device 100 used for detecting the color and/or color saturation of a specific surface of one or more colored/colorful objects to determine or estimate the distance between the colored/colorful objects according to an embodiment of the invention. For example, a colored/colorful object may be at least one of a toy building/construction brick/block, a toy brick/block, a colored/colorful plastic/wooden toy brick/block, a colored wooden cube, toy brick/blocks with different geometric shapes, and/or colored/colorful toys such as human/ robot/animal models (not limited). Also, the colored object mentioned above can be implemented by using a variety of materials which can be different from the plastic/wooden material.

The specific surface may be at least one partial/complete surface of a portion/part of the colored/colorful object, e.g. a surface of a top portion/part of a toy brick, a surface of a bottom portion/part of the toy brick, or a surface of any side portion/part of the toy brick; this is not meant to be a limitation. For example (but not limited), in one embodiment, each toy brick may have a top portion and a bottom portion wherein the top portion can be connected with a bottom portion of another toy brick and the bottom portion can be connected with a top portion of another different toy brick. Each top portion has a top surface. In addition, different and distinct toy bricks may have identical/different solid colors such as red, green, black, white, gray, pink, purple, blue, orange, and/or mixed colors generated from any color combinations. The color examples are not intended to a limitation of the invention.

The optical sensor device 100 can be applied into and installed within or on at least one colored/colorful object. For example, the optical sensor device 100 may be installed at a cavity of a bottom portion of a first toy brick such as the bottom position PS2 of toy brick B2 (or at a cavity of a bottom portion of a toy). The optical sensor device 100 may be installed at a top portion of the first toy brick such as the top position PS1 of toy brick B2. However, this is not intended to be a limitation. When a user such as a child plays and moves a first colored/colorful object to a second colored/colorful object, the optical sensor device 100, which is installed at the bottom portion of the first colored/colorful object, can be arranged to detect the actual distance (or the distance change) between the first and second colored/colorful objects to determine whether the user such as the child performs a corresponding user behavior or user action which is matched to a game's request or design. For instance, in order to make a child learn some skills such as fine motor skill, cooperative play skill, muscle persistence, and so on, a game design may request a child to move a first toy brick (e.g. the toy brick B2 show in FIG. 1 in which the optical sensor device 100 can be installed at the top/bottom of the toy brick B2) to a specific spatial position that is at a specific distance away from a second toy brick such as B1 or B3 shown in FIG. 1. In this situation, when the child takes and moves the first toy brick, the optical sensor device 100 can precisely determine whether the first toy brick has been moved to and kept at the specific spatial position by sensing the light reflected form a surface of a portion of the second toy brick to accurately detect the distance or distance change between the above-mentioned two toy bricks.

Figure 2:
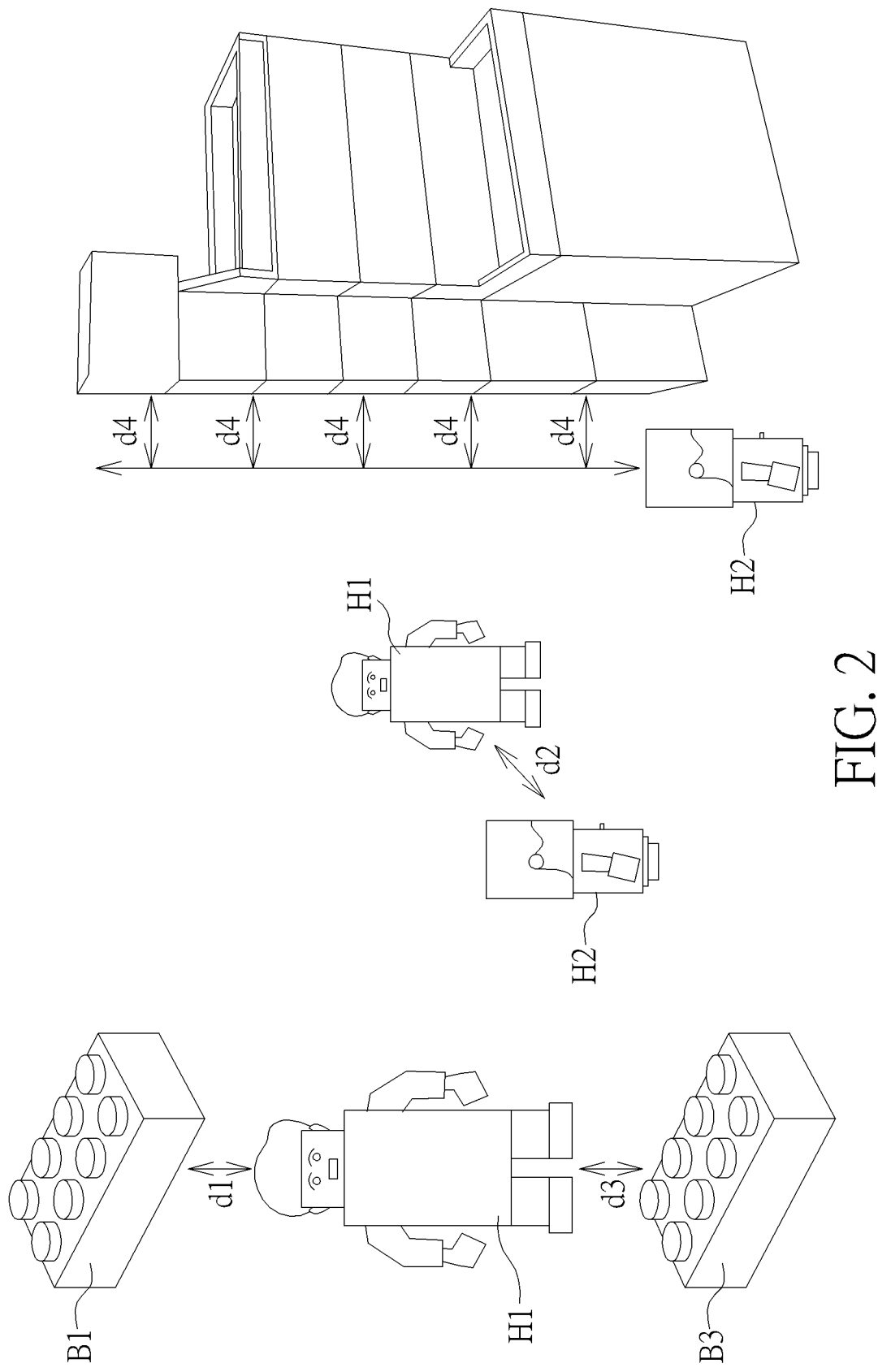
FIG. 2 is a diagram showing the examples of different applications based on the optical sensor device in FIG. 1.

In other embodiments, the optical sensor device 100 may be installed at a portion of a toy such as a human toy/model H1 (but not limited) as shown in the left example of FIG. 2 to determine whether a user moves the human toy/model H1 to a specific spatial position at a specific distance d1 or d3 away from one or more colored/colorful objects such as toy bricks B1 or B3. Additionally, in another embodiment, the optical sensor device 100 may be installed at a portion of a toy such as a human toy/model H2 (but not limited) as shown in the center example of FIG. 2 to determine whether a user moves the human toy/model H2 to a specific spatial position at a specific distance d2 away from a different human toy/model H1. Additionally, in other embodiment, the optical sensor device 100 may be installed at a portion of the human toy/model H2 (but not limited) as shown in the right example of FIG. 2 to determine whether a user moves and keeps the human toy/model H2 at different spatial positions in a straight direction such as a vertical direction (not limited) wherein the different spatial positions may be at the identical distance d4 or at different distances away from one or more colored/colorful objects. For instance, in the right example of FIG. 2, a game design may request a user sequentially moving and keeping the human toy/model H2 at different vertical positions which may be designed at identical/different distances from a model building or a model elevator (not limited).

In addition, in the above-mentioned embodiments, an audio playing unit/circuit may be further installed within the above-mentioned particular toy, toy brick, or a human model in which the optical sensor device 100 is installed. Thus, the optical sensor device 100 can generate and output a communication signal to the audio playing unit/circuit if it determines that a user moves the particular toy, toy brick, or a human model to successfully achieve the game's request or fails to achieve the game's request, so that the audio playing unit/circuit can play corresponding notification sounds for the user.

Further, in one embodiment, the optical sensor device 100 can be arranged to determine whether a user keeps a first colored/colorful object at a specific spatial position at a specific distance from a second colored/colorful object and then rotates the first colored/colorful object by detecting the color saturation (or color saturation change) of the image generated from the light reflected from a surface of a portion of the second colored/colorful object. That is, the color saturation detection of the optical sensor device 100 can be applied into a variety of applications to detect a user's behavior such as movement and rotation when the user plays colored/colorful objects.

The operation of color saturation detection and circuit components included within the optical sensor device 100 are described in the following paragraphs.

Refer to FIG. 1 again. In practice, as shown in the right of FIG. 1, the optical sensor device 100 comprises a light source such as a light emitting unit 103 (e.g. light emitting diode, but not limited), a sensor array 105, and a processing circuit 110. The light emitting unit 103 emits light to the specific surface of a portion/part (e.g. top, bottom, or side portion) of a colored/colorful object such as a colored toy brick B1 or B3. The sensor array 105 has a plurality of pixel units such as N×M pixel units and each pixel unit is used for receiving light reflected from the specific surface (e.g. a top surface of a top portion of a toy brick; but not limited) to generate a sensed pixel value so as to generate a specific image based on at least one pixel unit. The specific image means or indicates one or more sensed pixel values, i.e. at least one portion of sensed pixel values in a specific frame, or all sensed pixel values in the specific frame; this is not intended to be a limitation. Alternatively, in other embodiments, the light emitting unit 103 may be optional, and the optical sensor device 100 may exclude the light emitting unit 103. The sensor array 105 may sense the ambient light reflected from the specific surface to generate the sensed pixel value(s) if the intensity of the ambient light is enough. This modification also falls within the scope of the invention. The sensed pixel value(s) for example as represented by RGB color space can be converted by the processing circuit 110 into HSV color space to obtain the color saturation value for a specific color.

In addition, the processing circuit 110 is coupled to the sensor array 105, and it is used for determining which color is mainly associated with (or corresponds to) the specific surface of the toy brick and then is used for determining the distance or distance change by performing the color saturation detection based on the mainly associated color determined. For example, a toy manufacturer may produce and provide colored/colorful toy bricks according to a number of solid colors such as red, green, blue, yellow, gray, black, or other solid colors. Each toy brick has its solid color which may be identical to or different from the solid color of another different toy brick. The processing circuit 110 is arranged to determine which solid color is mainly associated with a toy brick according to the specific image sensed by the sensor array 105 from a specific surface of such toy brick.

For example, for a first color (or a first solid color) such as green, red, yellow, or other colors (but not limited), the processing circuit 110 determines whether the specific surface belongs to or is classified into the first color (i.e. green color). In practice, the processing circuit 110 is arranged to determine whether a large (or largest) proportion of sensed pixel values in the specific image is associated with the first color and determine whether a pixel number of the large proportion of the sensed pixel values is larger than a specific threshold such as a pixel number threshold TH_NUM. If it is determined that the large proportion of sensed pixel values is associated with the first color and the pixel number of the large proportion is larger than the specific threshold TH_NUM, then the processing circuit 110 determines that the specific image is similar to the first solid color image corresponding to the first color (i.e. the specific image is classified to or belongs to the first color).

Alternatively, in other embodiments, the processing circuit 110 may determine that the specific image is similar to the first solid color image corresponding to the first color once the processing circuit 110 determines that the large proportion of the sensed pixel values is associated with the first color. That is, no matter if such pixel number is larger than or smaller than the specific threshold TH_NUM, the processing circuit 110 determines that the specific image is similar to the first solid color image once it is determined that the large proportion of the sensed pixel values is associated with the first color.

In addition, the specific threshold TH_NUM may be configured as half (but not limited) of a total pixel number defined in the specific image wherein the total pixel number in the specific image indicates the total number of pixel units included within the specific image. For example, the specific threshold may be equal to K/2 if the specific image has the total pixel number K. it should be noted that the specific threshold may be equal to N×M/2 if the specific image indicates a full image or frame having the total pixel number N×M. That is, the specific threshold can be varied and its design is based on the design of the specific image. However, in one embodiment, the specific threshold can be configured as a fixed value. Further, in other embodiments, if the specific image comprises two or more than two portions of sensed pixel values which are respectively associated with different colors, the processing circuit 110 can select the color corresponding to the largest portion of sensed pixel values as the mainly associated color and then perform a corresponding color saturation detection based on the selected color. All the modification falls within the scope of the invention.

After determining that the specific image corresponds to or is classified into a specific solid color such as the first solid color, the processing circuit 110 is arranged for determining or estimating a specific distance from the optical sensor device 100 to a point/location on the specific surface. In practice, the processing circuit 110 for example estimates the specific distance based on a color saturation value of the first solid color in the specific image to determine the distance or distance change.

Figure 3:
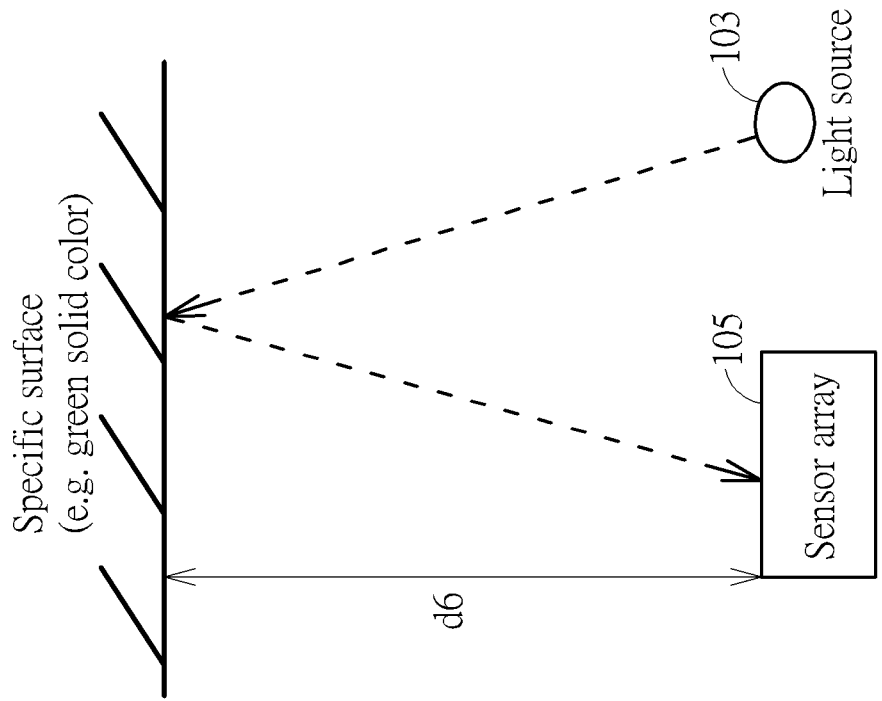
FIG. 3 is a diagram showing an example of the optical sensor device detecting or estimating the distance between the device and the specific surface by detecting the color saturation value of at least one pixel unit of an image generated from the reflected light from the specific surface according to an embodiment of the invention.
Figure 3:
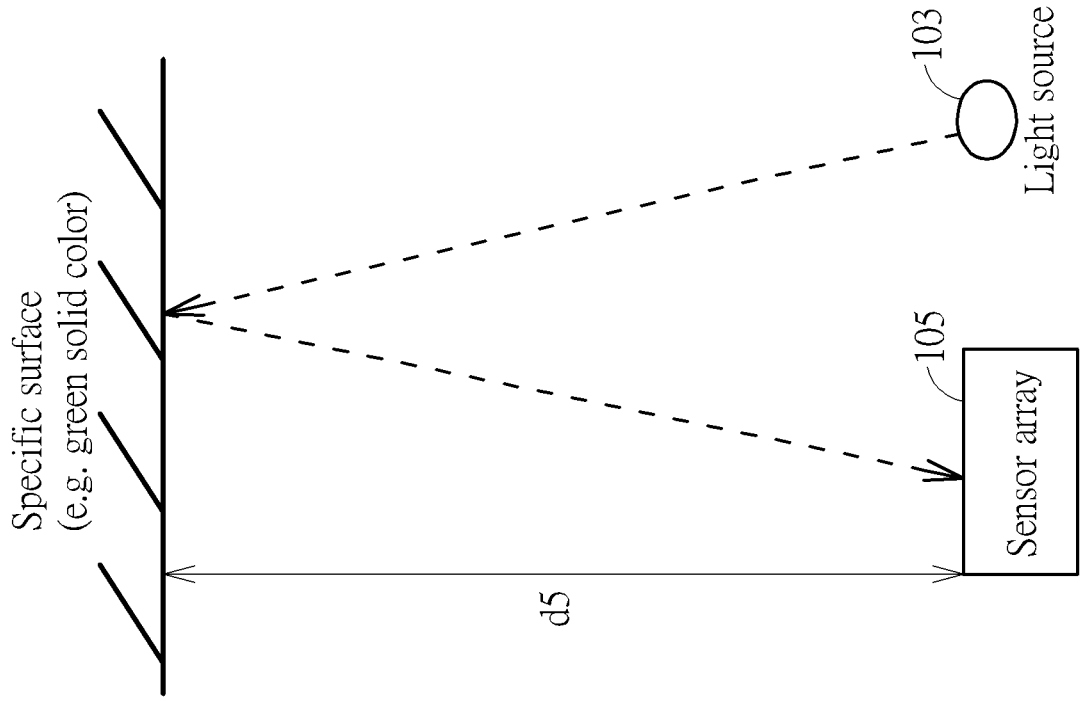

Refer to FIG. 3. FIG. 3 is a diagram showing an example of the optical sensor device 100 detecting or estimating the distance between the device 100 and the specific surface by detecting the color saturation value of at least one pixel unit of an image generated from the reflected light from the specific surface according to an embodiment of the invention. As shown in FIG. 3, under the same conditions of the same locations of the light source 103 and sensor array 105 and the same solid color (e.g. green color) of the specific surface, the color saturation value of at least one portion of image sensed by the sensor array 105 in the left example of FIG. 3 is lower than the color saturation value of at least one portion of image sensed by the sensor array 105 in the right example of FIG. 3 since actually the distance d5 between the optical sensor device 100 and specific surface as shown in the left example of FIG. 3 is longer than the distance d6 between the optical sensor device 100 and specific surface as shown in the right example of FIG. 3. Thus, after determining which solid color is associated with the specific surface, the processing circuit 110 can determine or estimate the spaced distance between the optical sensor device 100 and the specific surface based on the color saturation distribution of the associated solid color. It should be noted that the processing circuit 110 is arranged to select the color saturation distribution of the associated solid color from different color saturation distributions of different solid colors after the associated solid color is determined.

Figure 4:
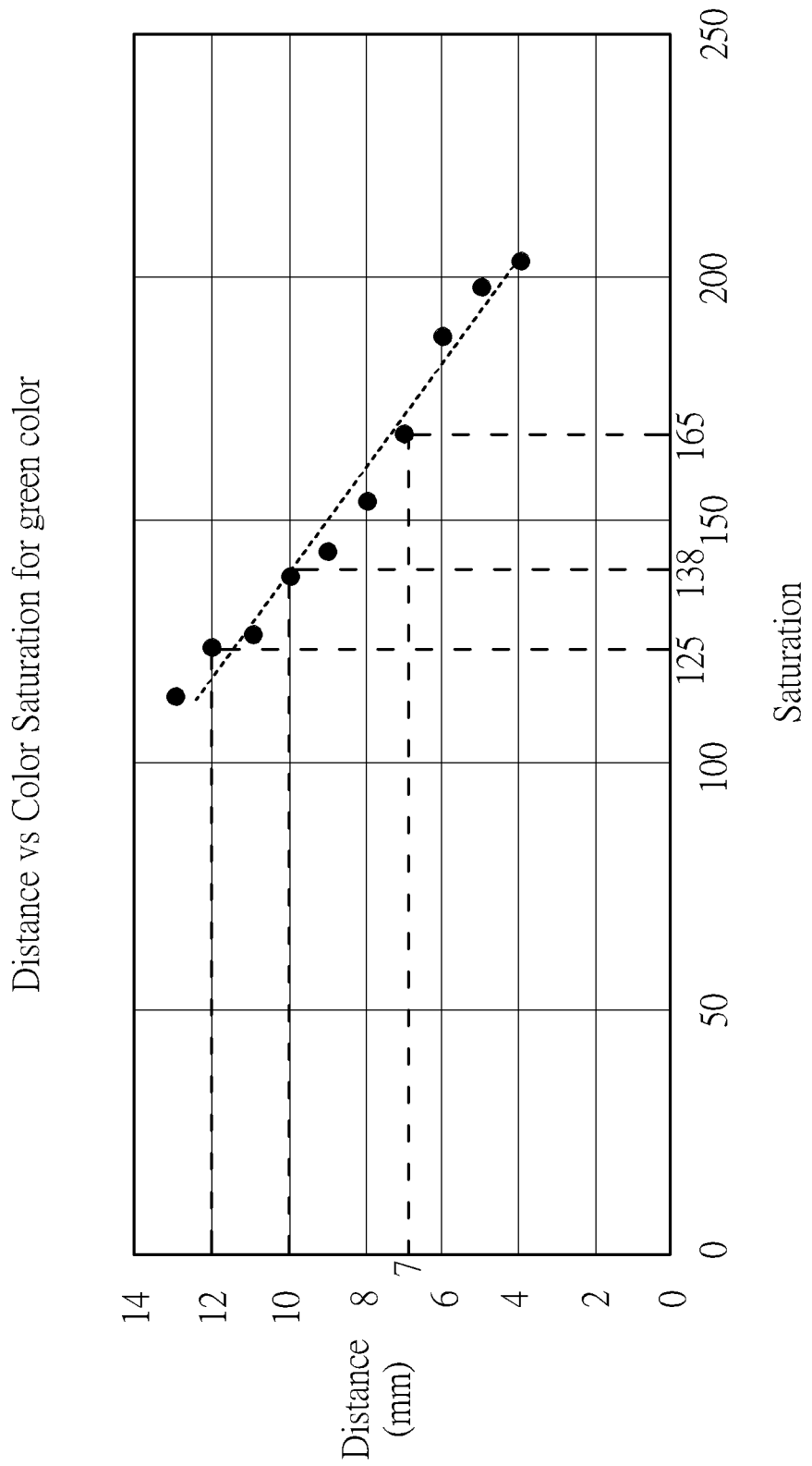
FIG. 4 is a diagram showing an example of the color saturation distribution of a first solid color such as the green solid color according to an embodiment of the invention.
Figure 5:
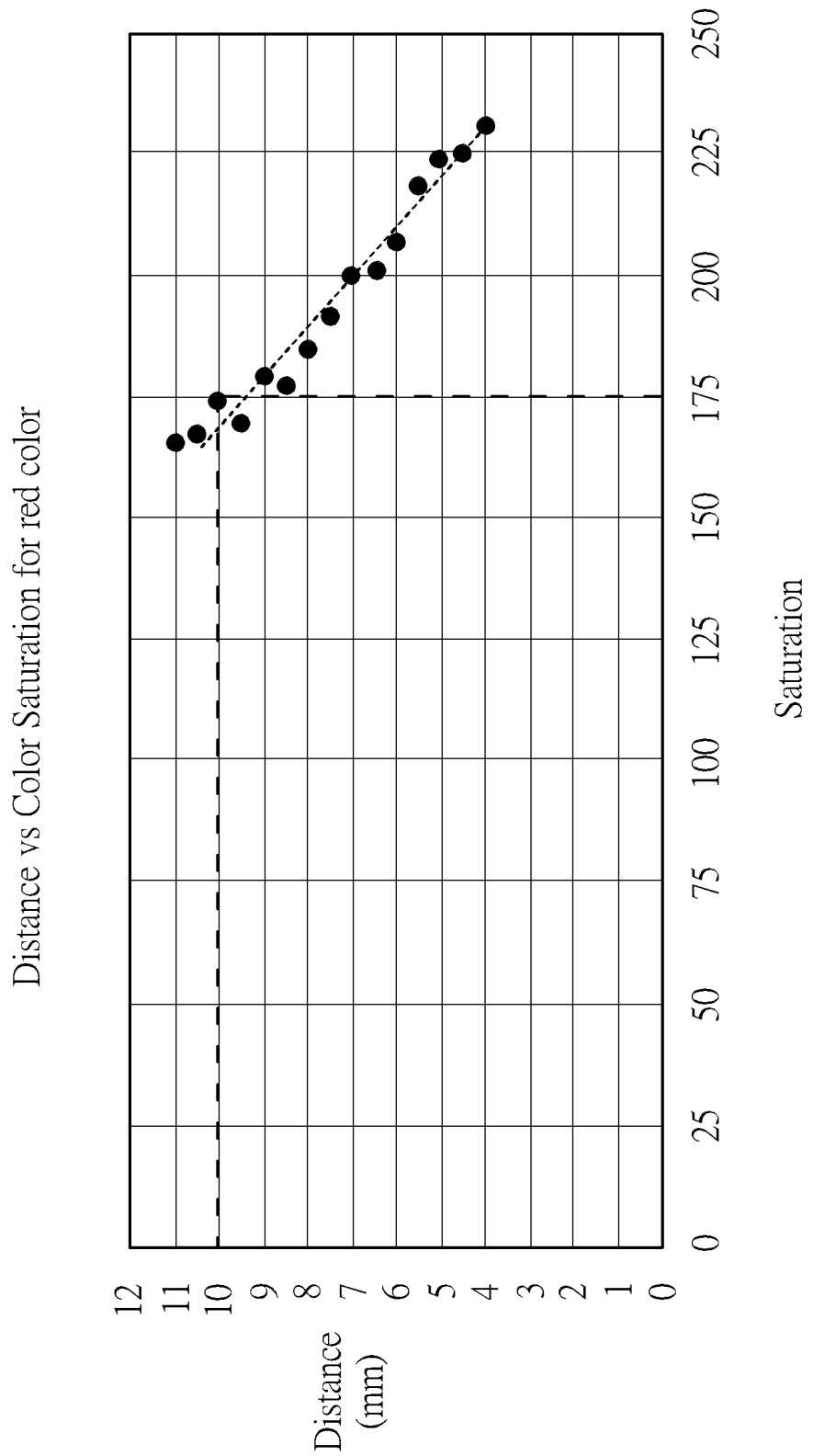
FIG. 5 is a diagram showing an example of the color saturation distribution of a second solid color such as the red solid color according to an embodiment of the invention.

Refer to FIG. 4 in conjunction with FIG. 5. FIG. 4 is a diagram showing an example of the color saturation distribution of a first solid color such as the green solid color according to an embodiment of the invention. FIG. 5 is a diagram showing an example of the color saturation distribution of a second solid color such as the red solid color according to an embodiment of the invention. In FIG. 4 and FIG. 5, the distance (the unit of length for example is millimeter (mm)) between two colored/colorful objects, estimated/determined by the processing circuit 110, is shown on the vertical axis, and the value of color saturation for the different colors such as green color in FIG. 4 and red color in FIG. 5, which is detected by the optical sensor device 100 by performing color saturation detection, is shown on the horizontal axis. The color saturation distributions of different solid colors are different and can be stored or recorded in a memory circuit (not shown in FIG. 1) of the processing circuit 110. In FIG. 4, for example, when the optical sensor device 100 installed in the first colored/colorful object is applied to detect whether a user moves to and keeps the first colored/colorful object at a spatial position at a distance such as 10 mm (not limited) away from the second colored/colorful object, the processing circuit 110 can determine that the user now move and keep at such spatial position if the color saturation value of the green color detected by the processing circuit 110 becomes or is equal/approximated to a value such as 138 (not limited). In FIG. 5, for the same distance such as 10 mm, the processing circuit 110 can determine that the user now move and keep at such spatial position if the color saturation value of the red color detected by the processing circuit 110 becomes or is equal/approximated to a value such as 175 (not limited).

For each different solid color, the processing circuit 110 can employ a corresponding different color saturation distribution of such solid color to precisely and accurately estimate the actual distance between two objects. For example, in FIG. 4, if the color saturation value of the green color detected by the processing circuit 110 becomes or is equal/approximated to a value such as 125 (not limited), the processing circuit 110 can determine the distance is equal or approximated to 12 mm. Alternatively, if the color saturation value of the green color detected by the processing circuit 110 becomes or is equal/approximated to a value such as 165 (not limited), the processing circuit 110 can determine the distance is equal or approximated to 7 mm. This operation is similar to the operation for red color in FIG. 5 and is not detailed for brevity.

In one embodiment, the processing circuit 110 can be arranged to compare the color saturation value of the first color (e.g. green color of FIG. 4) in the specific image with a color saturation threshold of the first color wherein the color saturation threshold may be determined or selected by a user or by the game request/design. The color saturation threshold can be different for each different solid color. For example, the color saturation threshold for the green color may be configured as 138 (not limited), and the processing circuit 110 can determine that the distance from the optical sensor device 100 to the specific surface (i.e. the distance between two objects) is within a specific distance range such as 10 mm corresponding to the saturation value 138 when it is determined that the color saturation value of the green color in the specific image is larger than the color saturation threshold of the green color. In addition, the processing circuit 110 may employ multiple different color saturation thresholds for the same solid color and sequentially compare the color saturation value of the solid color in the specific image with the multiple different color saturation thresholds so as to determine which exact distance range the optical sensor device 100 is away from the specific surface. The above-mentioned operations are similar to the operations for red color in FIG. 5 and are not detailed for brevity.

Further, in one embodiment, the processing circuit 110 may be arranged for determining not to calculate the distance or distance change mentioned above when it is determined that the specific image is not similar to one solid color image corresponding to any solid color. For instance, a toy manufacturer may provide colored/colorful toy objects with a limited number of solid colors in a default setting. For a specific image generated from the light reflected from the specific surface mentioned above, the processing circuit 110 may sequentially check and detect which solid color among the limited number of solid colors is mainly associated with the specific image. If the processing circuit 110 determines that none of the solid colors is mainly associated with the specific image, the processing circuit 110 does not calculate/estimate the distance or distance change mentioned above to avoid errors.

Figure 6:
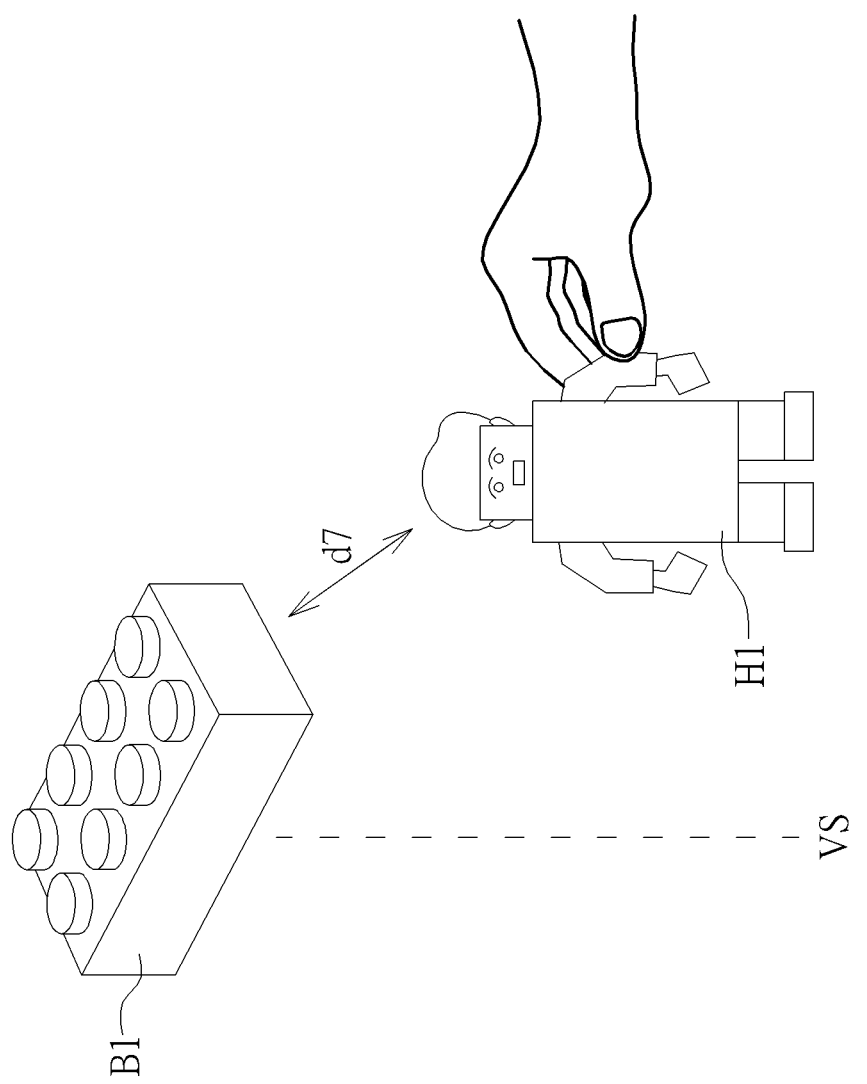
FIG. 6 is a diagram showing the example of another different application based on the optical sensor device in FIG. 1.

Further, in different applications, the optical sensor device 100 can be applied to detect or determine whether a user such as a child moves a first colored/colorful object to a spatial position at a specific distance away from a second colored/colorful object and over/under the second colored/colorful object. FIG. 6 is a diagram showing an example of a user such as a child moves the toy model H1 to a spatial position below the toy brick such as B1 but not under the toy brick B1 (i.e. not at a spatial position on the vertical dotted line VS). For example, the toy brick B1 may be with the solid red color which corresponds to the color saturation distribution of FIG. 5. The game request/design may request the user to move the toy model H1 to the spatial position under the toy brick B1 (i.e. on the vertical dotted line VS) and at the distance d7 away from the toy brick B1. The distance d7 may be configured as 10 mm (not limited). In one situation, the toy model H1 may not be moved to the specific position on the vertical dotted line VS under the toy brick B1 but it is moved to a different spatial position merely below the toy brick B1. In this situation, even though the distance between the toy brick B1 and the different spatial position merely below the toy brick B1 is equal to or approximated to the specified distance d7, the processing circuit 110 can still correctly determine that the toy model H1 is not moved to the specified spatial position and the user fails to achieve a specified behavior or action since the color saturation value for the red color in an image in this situation may be affected by other colors or light and thus the color saturation value for the red color, detected by the processing circuit 110 at the different spatial position merely below the toy brick B1, is significantly different from the value 175 (in FIG. 5) corresponding to the distance d7 such as 10 mm. This operation can be applied to detect whether a user moves an object to a specified position on the vertical dotted line VS over the toy brick B1.

Additionally, in some embodiments, the colored object mentioned above can be implemented by using a variety of materials which can be different from the plastic/wooden material, and the variety of materials or plastic/wooden material may have identical or different surface characteristics which are respectively associated with different color saturation curves for the same color or the same solid color. In addition, the different light conditions of different environments may be respectively associated with different color saturation distribution curves for the same color (or the same solid color). The optical sensor device 100 is able to generate different color saturation distribution curves each comprising multiple color saturation thresholds for each color (or solid color) in response to different materials and/or different ambient light conditions, and then it can sequentially compare one of the generated color saturation thresholds with the detected saturation value to determine the distance or the distance range. Alternatively, the different color saturation distribution curves of each different color or solid color may be prerecorded in the processing circuit 110, and the processing circuit 110 can dynamically determine to use an appropriate color saturation distribution curve based on a current operation condition. This is not intended to be a limitation.

Figure 7:
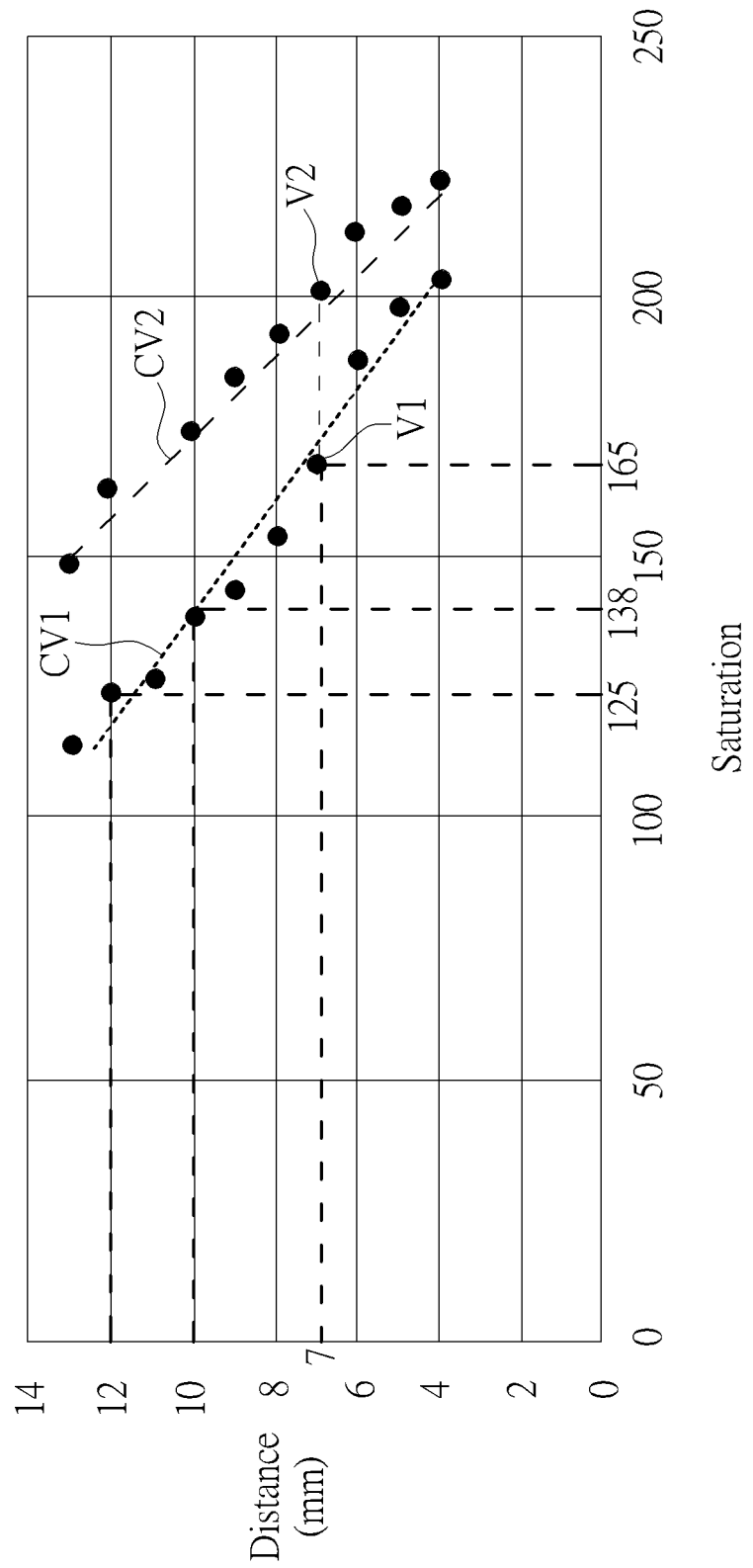
FIG. 7 is a diagram showing the examples of two different color saturation distribution curves CV1 and CV2 for the same color such as green color according to an embodiment of the invention.

Refer to FIG. 7. FIG. 7 is a diagram showing the examples of two different color saturation distribution curves CV1 and CV2 for the same color such as green color according to an embodiment of the invention. As shown in FIG. 7, the curve CV1 for example indicates the color saturation distribution associated with a rough surface made by a first material and/or a dark ambient light condition, and the curve CV2 for example indicates another color saturation distribution associated with an even (flat or smooth) surface made by a second material different from the first material and/or a bright ambient light condition. The number of curves is not intended to be a limitation; in other embodiments, the same color may correspond to more than color saturation distribution curves. The color saturation distribution curves CV1 and CV2 can be stored or prerecorded in the processing circuit 110 or can be generated by the processing circuit 110.

For example, a first colored/colorful object can be gradually moved near or close to a second colored/colorful object, and the processing circuit 110 of the optical sensor device 100 installed in the first colored/colorful object can enter a presetting mode (or a training mode) and in the presetting mode the processing circuit 110 is arranged to detect and determine the surface characteristic of the material and/or ambient light condition according to the captured image(s)

generated by the reflected light from one or more surfaces of the second colored/colorful object.

If the second colored/colorful object is made by a material with a rough surface and/or it is in the dark ambient light condition, the processing circuit 110 in this situation may select and use the saturation values of the color saturation distribution curve CV1 as the color saturation thresholds of the green color for the rough surface and/or the dark ambient light condition. If the second colored/colorful object is made by a different material with a smooth surface and/or it is in the bright ambient light condition, the processing circuit 110 may select and use the saturation values of the color saturation distribution curve CV2 as the color saturation thresholds of the green color for the smooth surface and/or the bright ambient light condition. That is, color saturation threshold(s) can be determined according to at least one of the surface characteristic (e.g. rough or smooth) and ambient light condition (e.g. dark or bright).

This can more accurately determine the distance between two colored/colorful objects. For example, a first user and a second user may play different colored/colorful objects and each user actually moves and keeps the distances between his/her colored/colorful objects at a distance value such as almost 7 mm while the different colored/colorful objects may be made by different materials and/or in the different ambient light conditions, the processing circuit 110 installed in a first colored/colorful object for detecting a second colored/colorful object may use the color saturation value V1 as a color saturation threshold so that the processing circuit 110 can generate a correct result which indicates that the distance is equal to or approximated to 7 mm. Also, another processing circuit 110 with the same operations, installed in a third colored/colorful object for detecting a fourth colored/colorful object may use the different color saturation value V2 as the color saturation threshold so that the processing circuit 110 can also generate a correct result which indicates that the distance is equal to or approximated to 7 mm even though the operation condition is different.

In the embodiments, the operation for determining the surface characteristic of a material may be implemented by detecting the change (s) of the image patterns of the captured images generated from the reflected light from the material, and the different surface characteristics are associated with different changes of image patterns. In addition, the operation for determining an ambient light condition may be implemented by detecting the average or the sum of brightness values of all or most pixels in one or more captured images, and the different ambient light conditions are associated with different averages or different sums of brightness values. For instance, the higher intensity of one or more captured images is associated with a brighter ambient light condition or a smooth surface. All the above-mentioned examples are not intended to be limitations of the invention, and other modifications may be employed to achieve the operations mentioned above.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of an optical sensor device used for detecting a color of a specific surface of an object, comprising:
providing a sensor array having a plurality of pixel units each for receiving light reflected from the specific surface to generate a sensed pixel value;
using the sensor array to generate a specific image formed by a plurality of sensed pixel values;
determining whether the specific image is similar to a first solid color image corresponding to a first color according to the plurality of sensed pixel values of the specific image; and
determining to execute a distance detection operation to calculate a specific distance from the optical sensor device to the specific surface according to a color saturation value of the first color in the specific image when it is determined that the specific image is similar to the first solid color image corresponding to the first color.

2. The method of claim 1, further comprising:
determining that the specific image is similar to the first solid color image corresponding to the first color when a large proportion of the plurality of sensed pixel values is associated with the first color and a pixel number of the large proportion of the plurality of sensed pixel values is higher than a specific threshold.

3. The method of claim 1, further comprising:
determining that the specific image is similar to the first solid color image corresponding to the first color once a large proportion of the plurality of sensed pixel values is associated with the first color.

4. The method of claim 1, further comprising:
determining the specific distance from the optical sensor device to the specific surface by comparing the color saturation value of the first color in the specific image with a color saturation threshold of the first color.

5. The method of claim 4, further comprising:
determining the color saturation threshold according to at least one of a surface characteristic of the specific surface and an ambient light condition.

6. The method of claim 4, further comprising:
determining the specific distance from the optical sensor device to the specific surface is within a specific distance range when the color saturation value of the first color in the specific image is larger than the color saturation threshold of the first color.

7. The method of claim 1, further comprising:
determining not to calculate the specific distance from the optical sensor device to the specific surface when the specific image is not similar to the first solid color image.

8. The method of claim 1, further comprising:
determining whether the specific image is similar to a second solid color image corresponding to a second color; and
determining to calculate the specific distance according to a color saturation value of the second color in the specific image when the specific image is similar to the second solid color image corresponding to the second color.

9. The method of claim 8, wherein the first color and the second color are different colors of different toy building bricks/blocks.

10. The method of claim 1, wherein the specific surface is a top surface of a toy brick/block, and the optical sensor device is installed at a cavity of a bottom portion of another toy brick/block.

* * * * *